United States Patent
Going et al.

(10) Patent No.: US 11,662,444 B1
(45) Date of Patent: May 30, 2023

(54) TECHNIQUES FOR IMPROVING SNR IN A FMCW LIDAR SYSTEM USING A COHERENT RECEIVER

(71) Applicant: AEVA, INC., Mountain View, CA (US)

(72) Inventors: Ryan Wayne Going, Los Altos, CA (US); Kumar Bhargav Viswanatha, Santa Clara, CA (US); Pradeep Srinivasan, Fremont, CA (US); Srikanth Kuthuru, San Jose, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/875,325

(22) Filed: Jul. 27, 2022

(51) Int. Cl.
*G01S 7/4912* (2020.01)
*G01S 7/481* (2006.01)

(52) U.S. Cl.
CPC .......... *G01S 7/4917* (2013.01); *G01S 7/4817* (2013.01)

(58) Field of Classification Search
None
See application file for complete search history.

(56) References Cited

U.S. PATENT DOCUMENTS

| | | | |
|---|---|---|---|
| 10,838,061 B1 * | 11/2020 | Crouch | G01S 17/931 |
| 2014/0269790 A1 * | 9/2014 | Sebastian | G01J 9/00 372/20 |
| 2014/0376001 A1 * | 12/2014 | Swanson | G01N 21/17 356/479 |
| 2020/0196874 A1 * | 6/2020 | Rozental | G02F 1/11 |
| 2021/0072385 A1 * | 3/2021 | Sandborn | G01S 17/34 |
| 2022/0075076 A1 * | 3/2022 | Michaels | G01S 17/931 |
| 2022/0187458 A1 * | 6/2022 | Piggott | G01S 7/4865 |

FOREIGN PATENT DOCUMENTS

WO WO-2021150826 A1 * 7/2021 ............. G01S 17/34

* cited by examiner

*Primary Examiner* — Yuqing Xiao
*Assistant Examiner* — Jempson Noel
(74) *Attorney, Agent, or Firm* — Womble Bond Dickinson (US) LLP

(57) ABSTRACT

The LiDAR system includes a coherent receiver disposed in a reference path. The coherent receiver includes a 90° optical hybrid to receive a portion of an optical beam along the reference path and a local oscillator (LO) signal to generate multiple output signals. The coherent receiver includes a first photodetector to receive a first and a second output signal to generate a first mixed signal, and a second photodetector to receive a third and a fourth output signal to generate a second mixed signal. The LiDAR system further includes a processor to combine the first mixed signal and the second mixed signal to generate a combined reference signal to suppress a negative image of a reference beat frequency signal to estimate a phase noise of the optical source to determine range and velocity information of the target.

19 Claims, 12 Drawing Sheets

900

```
┌─────────────────────────────────────────────────────────────────┐
│ Emit an optical beam by an optical source along a target path   │
│ towards a target and a reference path                           │
│                                                             902 │
└─────────────────────────────────────────────────────────────────┘
                                  │
                                  ▼
┌─────────────────────────────────────────────────────────────────┐
│ Receive and mix a portion of the optical beam and a local       │
│ oscillator (LO) signal by a coherent receiver disposed in the   │
│ reference path                                              904 │
└─────────────────────────────────────────────────────────────────┘
                                  │
                                  ▼
┌─────────────────────────────────────────────────────────────────┐
│ Receive the portion of the optical beam and the LO signal by a  │
│ 90° optical hybrid to generate a first, a second, a third and   │
│ a fourth output signal                                          │
│                                                             906 │
└─────────────────────────────────────────────────────────────────┘
                                  │
                                  ▼
┌─────────────────────────────────────────────────────────────────┐
│ Receive the first and the second output signal by a first       │
│ photodetector to generate a first mixed signal                  │
│                                                             908 │
└─────────────────────────────────────────────────────────────────┘
                                  │
                                  ▼
┌─────────────────────────────────────────────────────────────────┐
│ Receive the third and the fourth output signal by a second      │
│ photodetector to generate a second mixed signal                 │
│                                                             910 │
└─────────────────────────────────────────────────────────────────┘
                                  │
                                  ▼
┌─────────────────────────────────────────────────────────────────┐
│ Combine, by a processor, the first mixed signal and the second  │
│ mixed signal to generate a combined reference signal to         │
│ suppress a negative image of a beat frequency signal produced   │
│ by the optical beam and the LO signal to estimate a phase       │
│ noise of the optical source to determine range and velocity     │
│ information of the target                                   912 │
└─────────────────────────────────────────────────────────────────┘
```

FIG. 9

TECHNIQUES FOR IMPROVING SNR IN A FMCW LIDAR SYSTEM USING A COHERENT RECEIVER

TECHNICAL FIELD

The present disclosure relates generally to light detection and ranging (LiDAR) systems, and more particularly to a FMCW LiDAR system with a coherent receiver.

BACKGROUND

Frequency-Modulated Continuous-Wave (FMCW) LiDAR systems may use a reference optical path with a delay of known length to create a reference beat frequency. A linear representation of the phase noise of an optical source may be extracted from the reference beat frequency in order to remove the peak spreading effects of the phase noise for a target. With a single or balanced coherent detector in the reference optical path, the phase noise from the positive image and the negative image of the reference beat signal in the frequency domain may overlap, which may degrade the quality of the linear phase noise estimation and result in a lowered signal to noise ratio (SNR) for the target.

SUMMARY

The present disclosure describes various examples of coherent reference receivers in LiDAR systems, e.g., in a FMCW LiDAR system.

In some examples, disclosed herein is a FMCW LiDAR system using a coherent reference receiver for improving a target SNR. The coherent reference receiver in a reference delay path may include a 90° optical hybrid receiver feeding the full complex beat signal into the signal processing chain. Combining the outputs of the 90° optical hybrid receiver results in suppression of the negative frequency image. Some signal processing schemes are provided to correct for the imperfections of the 90° optical hybrid receiver, and to account for the effects of up/down chirped signals from an optical source. By this method, the target SNR is improved with image suppression for low reference beat frequencies.

In some examples, a LiDAR system is disclosed herein. The LiDAR system includes an optical source to emit an optical beam along a target path towards a target and a reference path. The LiDAR system includes a coherent receiver disposed in the reference path. The coherent receiver includes a 90° optical hybrid to receive a portion of the optical beam along the reference path and a local oscillator (LO) signal to generate a first, a second, a third and a fourth output signal. The coherent receiver includes a first photodetector to receive the first and the second output signal to generate a first mixed signal. The coherent receiver further includes a second photodetector to receive the third and the fourth output signal to generate a second mixed signal. The coherent receiver is disposed to mix the portion of the optical beam with the LO signal. The LiDAR system further includes a processor to combine the first mixed signal and the second mixed signal to generate a combined reference signal to suppress a negative image of a reference beat frequency signal produced by the optical beam and the LO signal to estimate a phase noise of the optical source to determine range and velocity information of the target.

In some examples, a method of light detection and ranging is disclosed herein. The method includes emitting an optical beam by an optical source along a target path towards a target and a reference path. The method includes receiving and mixing a portion of the optical beam and a local oscillator (LO) signal by a coherent receiver disposed in the reference path. The method includes receiving the portion of the optical beam and the LO signal by a 90° optical hybrid to generate a first, a second, a third and a fourth output signal. The method includes receiving the first and the second output signal by a first photodetector to generate a first mixed signal. The method includes receiving the third and the fourth output signal by a second photodetector to generate a second mixed signal. The method further includes combining, by a processor, the first mixed signal and the second mixed signal to generate a combined reference signal to suppress a negative image of a reference beat frequency signal produced by the optical beam and the LO signal to estimate a phase noise of the optical source to determine range and velocity information of the target.

It should be appreciated that, although one or more embodiments in the present disclosure depict the use of point clouds, embodiments of the present invention are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements:

FIG. 9 is a flow diagram illustrating an example of a method of using a coherent reference receiver in a LiDAR system according to embodiments of the present disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
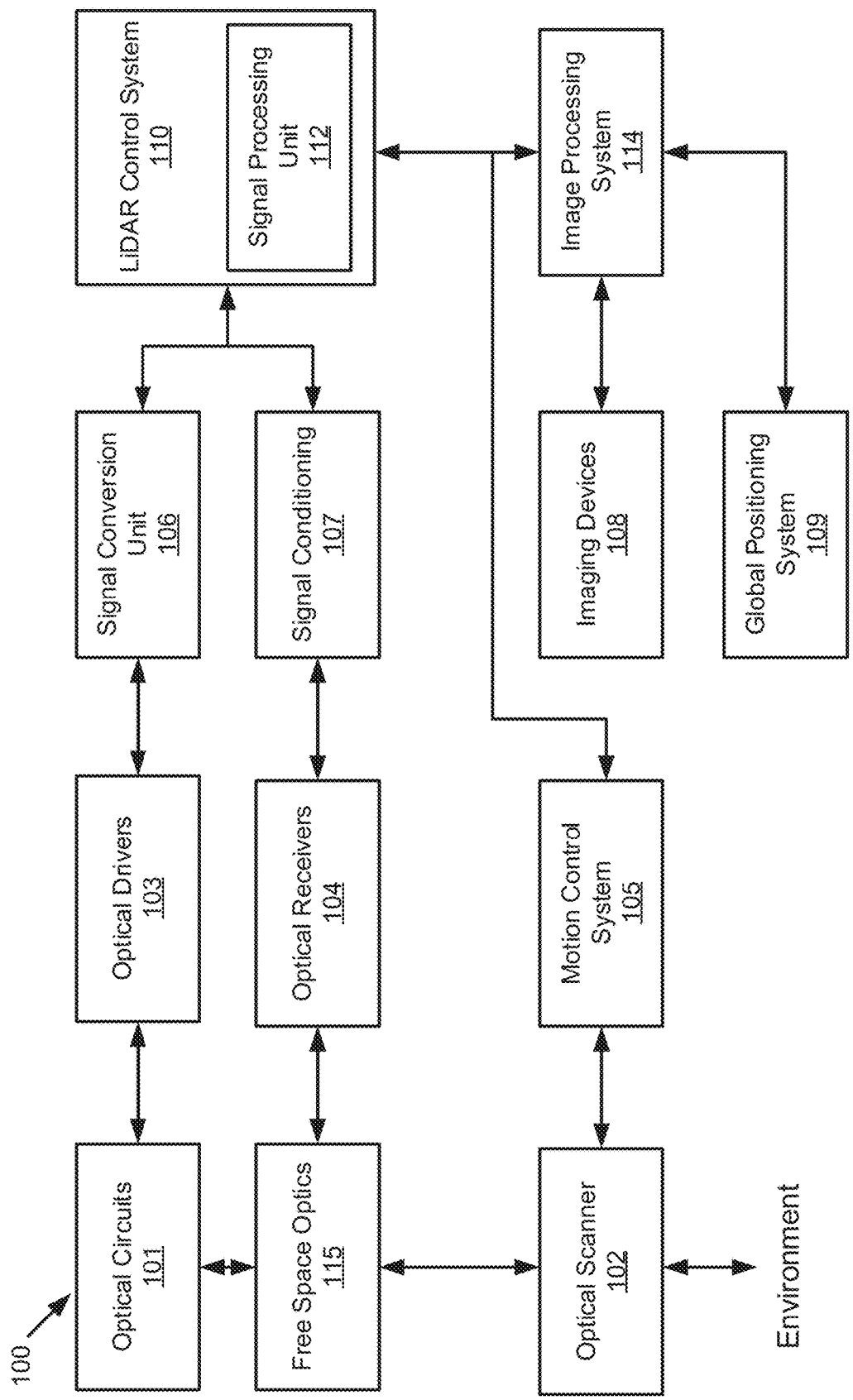
FIG. 1A is a block diagram illustrating an example LiDAR system according to embodiments of the present disclosure.

FIG. 1A illustrates a LiDAR system 100 according to example implementations of the present disclosure. The LiDAR system 100 includes one or more of each of a number of components, but may include fewer or additional components than shown in FIG. 1A. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
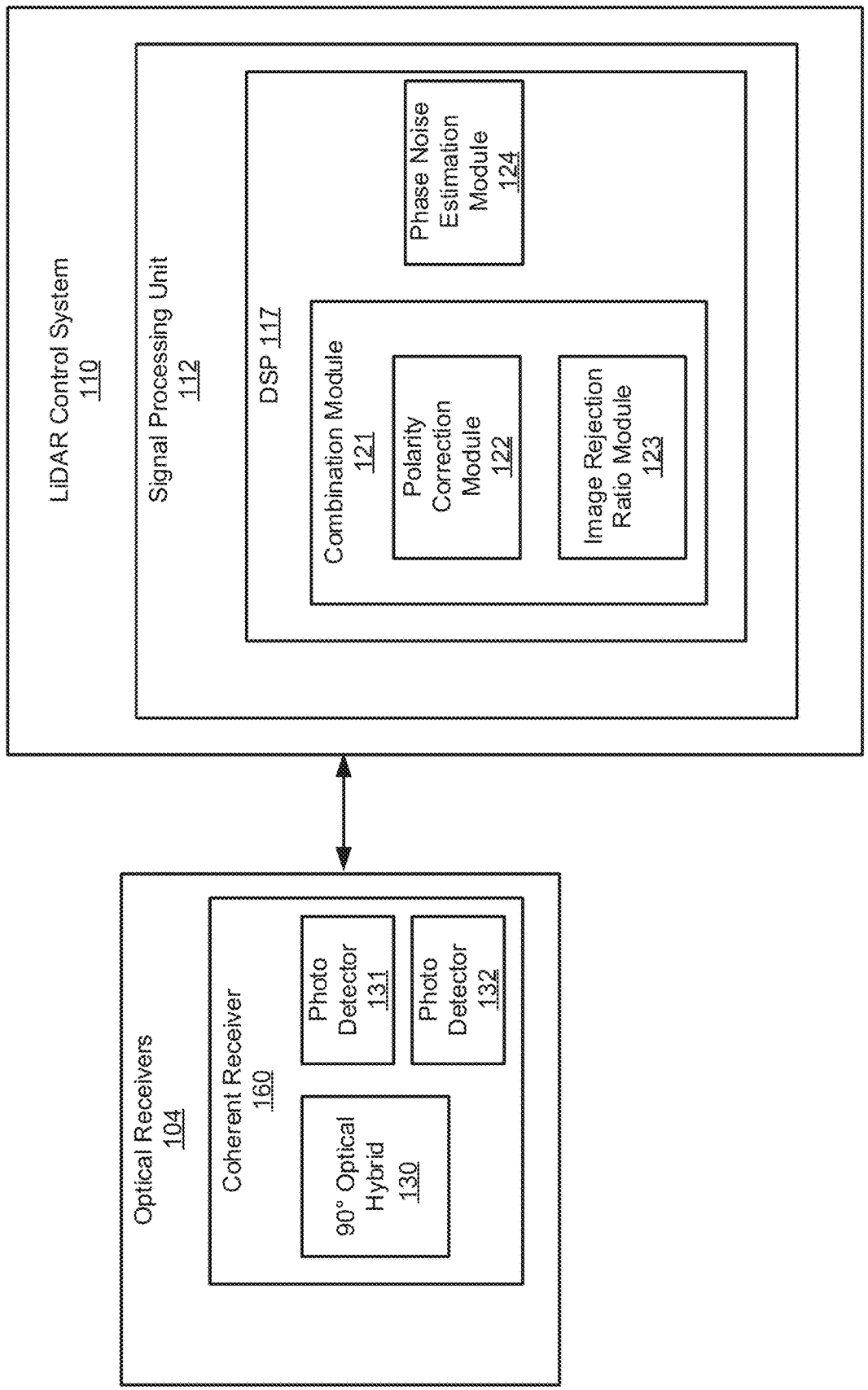
FIG. 1B is a block diagram illustrating an example of a coherent receiver in a LiDAR system according to embodiments of the present disclosure.

FIG. 1B is a block diagram illustrating an example of a coherent receiver 160 in the LiDAR system 100 according to embodiments of the present disclosure. The LIDAR system 100 further includes a reference arm to generate one or more digitally sampled reference signals. For example, the LiDAR system 100 includes an optical source to emit an optical beam along a target path towards a target and a reference path with a delay of known length. The LiDAR system 100 includes a coherent reference receiver in the reference path for improving the SNR for the target. The coherent receiver 160 includes a 90° optical hybrid 130 to receive a portion of the optical beam along the reference path and a LO signal in the reference path to generate multiple output signals. The coherent receiver 160 further includes one or more photodetectors (e.g., 131, 132) to receive the output signals of the 90° optical hybrid 130 and to generate one or more mixed signals. The one or more mixed signals are used to estimate the phase noise of the optical source in the transmitted signals.

As depicted in FIG. 1B, the signal processing unit 112 of the LiDAR system 100 includes a digital signal processing module 117, which includes a combination module 121 and a phase noise estimation module 124. The combination module 121 is configured to combine the one or more mixed signals to generate a combined reference signal to suppress a negative image of a reference beat frequency signal produced by the optical beam and the LO signal. The phase noise estimation module 124 is configured to estimate a phase noise of the optical source to determine range and velocity information of the target. The combination module 121 may include a polarity correction module 122 to account for the effects of up/down chirped signals from the optical source. The combination module 121 may further include an image rejection ratio module 123 to correct for the imperfections of the 90° optical hybrid. In this way, the negative image of the reference beat frequency signal is suppressed. Thus, the SNR for the target is improved. Therefore, the accuracy of the range and velocity information of the target is improved.

Figure 2:
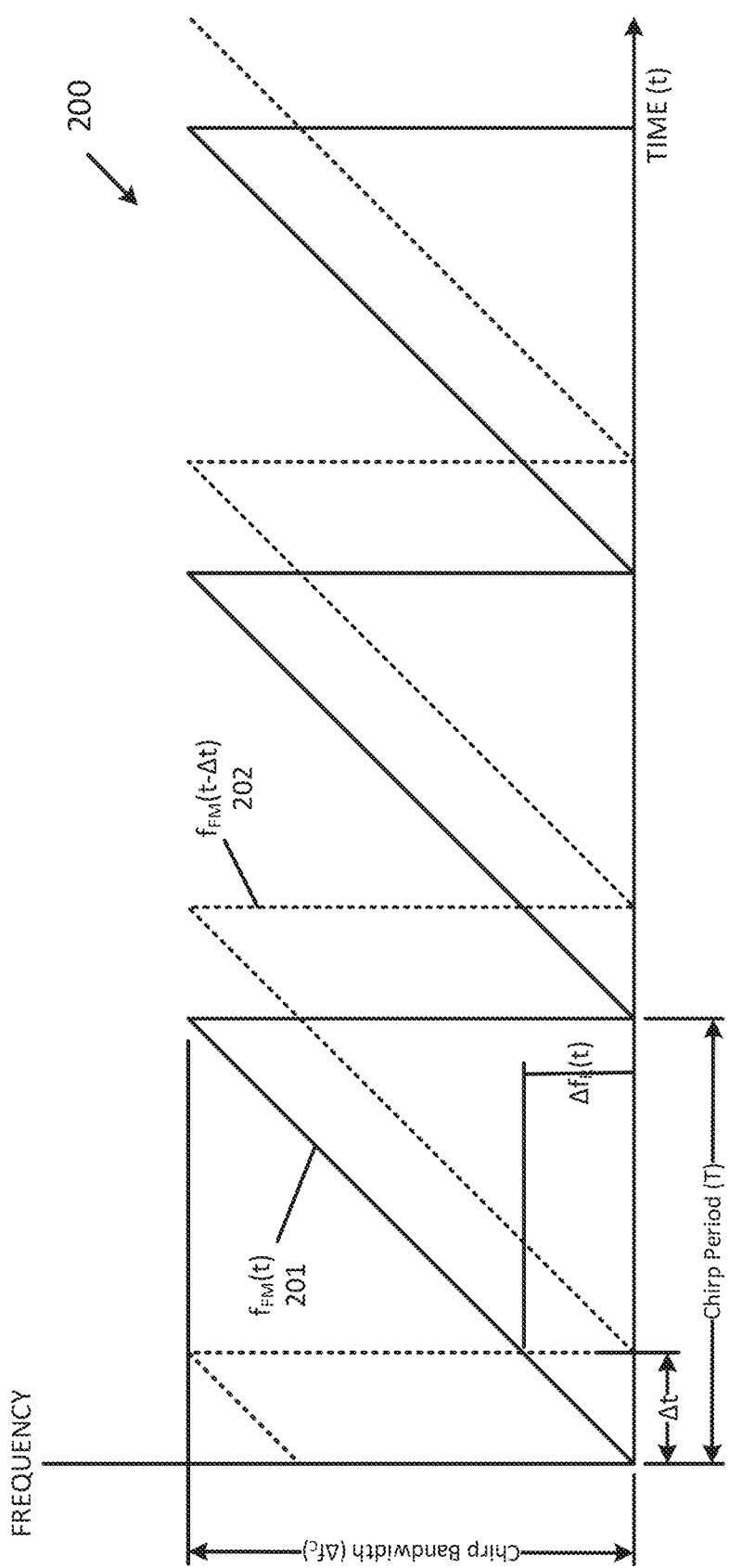
FIG. 2 is a time-frequency diagram illustrating an example of FMCW LIDAR waveforms according to embodiments of the present disclosure.

FIG. 2 is a time-frequency diagram 200 of an FMCW scanning signal 201 that can be used by a LiDAR system, such as system 100, to scan a target environment according to some embodiments. In one example, the scanning signal waveform 201, labeled as fFM(t), is a sawtooth waveform (sawtooth "chirp") with a chirp bandwidth ΔfC and a chirp period TC. The slope of the sawtooth is given as k=(ΔfC/TC). FIG. 2 also depicts target return signal 202 according to some embodiments. Target return signal 202, labeled as fFM(t−Δt), is a time-delayed version of the scanning signal 201, where Δt is the round trip time to and from a target illuminated by scanning signal 201. The round trip time is given as Δt=2R/v, where R is the target range and v is the velocity of the optical beam, which is the speed of light c. The target range, R, can therefore be calculated as R=c(Δt/2). When the return signal 202 is optically mixed with the scanning signal, a range dependent difference frequency ("beat frequency") ΔfR(t) is generated. The beat frequency ΔfR(t) is linearly related to the time delay Δt by the slope of the sawtooth k. That is, ΔfR(t)=kΔt. Since the target range R is proportional to Δt, the target range R can be calculated as R=(c/2)(ΔfR(t)/k). That is, the range R is linearly related to the beat frequency ΔfR(t). The beat frequency ΔfR(t) can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing (ΔfRmax) is 500 megahertz. This limit in turn determines the maximum range of the system as Rmax=(c/2)(ΔfRmax/k) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
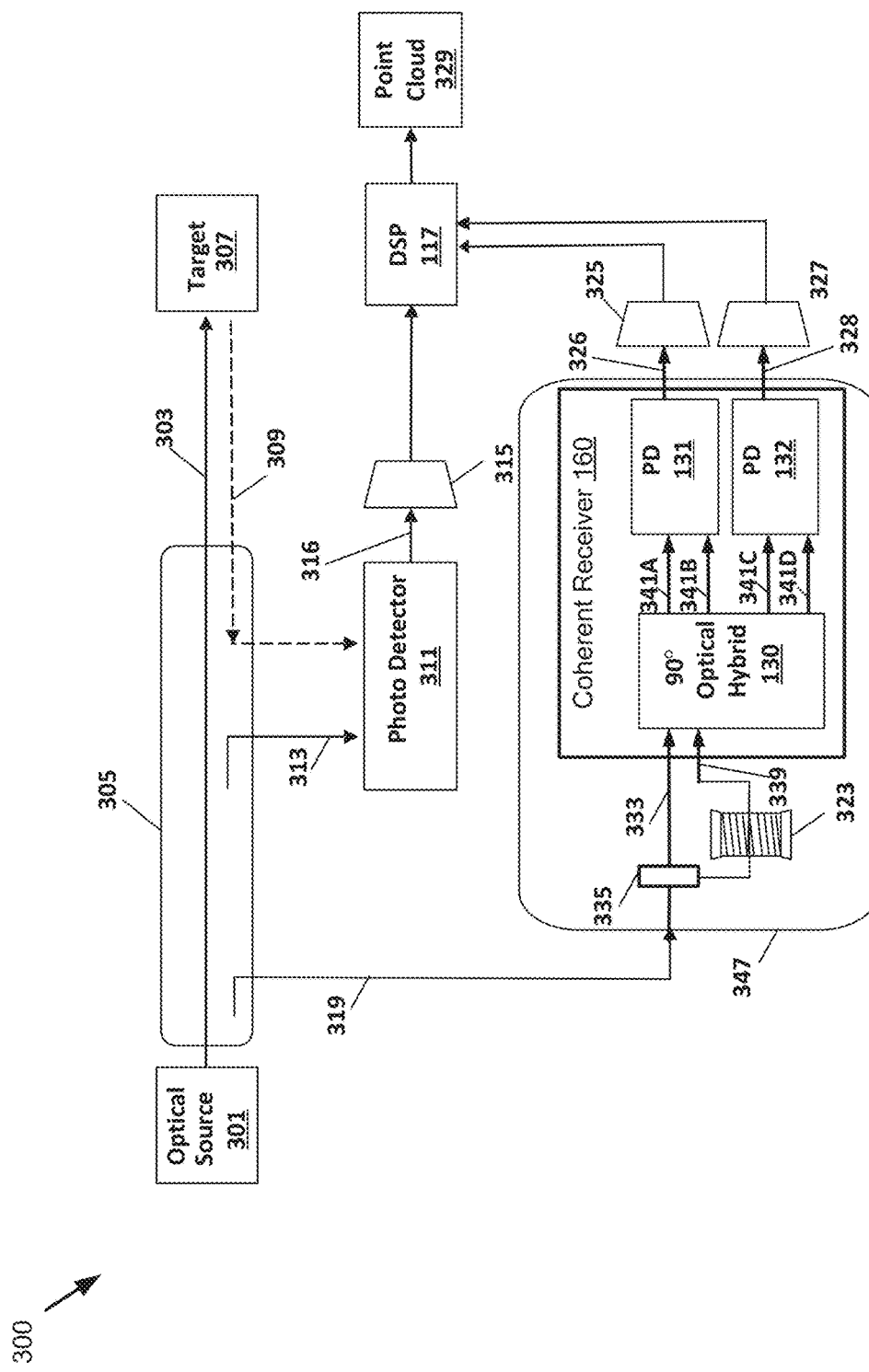
FIG. 3 is a block diagram illustrating an example of a LiDAR system using a coherent reference receiver according to embodiments of the present disclosure.

FIG. 3 is a block diagram 300 illustrating an example of the LiDAR system 100 using the coherent receiver 160, according to embodiments of the present disclosure. For instance, the system 100 includes the optical source 301, such as a FMCW laser source. The target arm 305 includes a number of optical components (e.g. lenses, filters, and the like) through which the optical beam 303, which includes the scanning signal, passes on its way to a target 307. The return signal 309 may be reflected from the target 307 and directed to a photo detector 311 (e.g., included in the optical receivers 104 in FIG. 1A). In some embodiments, a local oscillator (LO) signal 313, which is a portion of the optical beam 303, is directed to the photo detector 311 to mix with the return signal 309. From the photo detector 311, a digitally sampled target signal 316 then passes to a target ADC 315, and then to the DSP 117.

As depicted in FIG. 3, the LIDAR system 100 includes a reference arm 347 to generate one or more digitally sampled reference signals 326, 328 that can be used to estimate the phase noise of the optical source 301 in the transmitted signals. In this fashion, reference arm 347 creates one or more digitally sampled reference signals 326, 328 corresponding to the target (e.g., target 307) at a known delay with the phase noise similar to that on the received signal from the target 307. The one or more digitally sampled reference signals 326, 328 may be used to estimate the phase noise of the optical source 301 for subsequent correction.

For instance, the reference arm 347 receives a portion 319 of the optical beam 303, which may be provided to the coherent receiver 160 directly, and also after passing through a delay device 323 having a known length and/or delay. According to some embodiments, the signal portion 319 is received by the coherent receiver 160 in the reference arm 347 as the scanning signal of the optical beam 303 is transmitted contemporaneously through the optical components of the target arm 305. According to some embodiments, the signal portion 319 is received by the coherent receiver 160 after the scanning signal of the optical beam 303 is transmitted through the optical components of the target arm 305. According to some embodiments, the delay device 323 may be a fiber delay device, etc. In one embodiment, the delay device 323 may include a fiber coil with a known length that may create a virtual target (e.g., fiber target) at a known distance.

In some scenarios, the virtual target's distance may be pre-determined. An optical signal 339 at the output of the reference delay 323 may have the same characteristics as the target return signal 202 depicted in FIG. 2. According to some embodiments, in a manner similar to that described in FIG. 2, virtual targets described herein may produce the optical signal 339 that is a time-delayed version of the optical beam 303.

Referring to FIG. 3, the coherent receiver 160 may receive the optical signal 339 and a reference LO signal 333. As an example, the reference arm 347 may also include a reference LO generator 335 to generate the reference LO signal 333, which is a portion of the optical beam 303. The optical signal 339 is the portion 319 of the optical beam 303 after the reference delay 323 along the reference path. When the optical signal 339 is optically mixed with the reference LO signal 333, a reference beat frequency is generated. The coherent receiver 160 includes the 90° optical hybrid 130, which has two inputs to receive the optical signal 339 and the reference LO signal 333 in the reference path. The 90° optical hybrid 130 further has four outputs 341A, 341B, 341C, 341D, which mix the two input optical signals in 90° phase intervals from each other (which will be discussed in detail below).

The coherent receiver 160 may include one or more photo detectors 131, 132 to output the reference arm signals 326, 328. For example, the photo detectors 131 may receive the output signals 341A, 341B and generate the mixed signal 326, and the photo detectors 132 may receive the output signals 341C, 341D and generate the mixed signal 328.

The mixed signals 326, 328 may pass to reference ADCs 325, 327, and then to the DSP 117. The mixed signals 326, 328 may be combined, at the DSP 117, to generate a combined reference signal to suppress a negative image of the reference beat frequency signal produced by the optical signal 339 and the reference LO signal 333. Combining the outputs of the 90° optical hybrid receiver in the manner described by embodiments of the present disclosure results in the suppression of the negative frequency image of the reference beat frequency signal. In this way, the target SNR is improved with the image suppression for low reference beat frequencies. Therefore, the accuracy of determining the range and velocity information of the target is improved.

As an example, the mixed signals 326, 328 form the photodetector 131, 132 may be used to feedback to the driver of the optical source 301 to linearize or provide feedback control of the scan signal. The range and velocity information of the target may be determined according to the transmission and receipt of various signals, including the digitally sampled target signal 316 and the combined reference signal based on the digitally sampled reference signals 326, 328. As an example, a point cloud 329 may be produced to determine range and velocity information of the target. Some signal processing schemes may be used to correct for the imperfections of the 90° optical hybrid receiver, and to account for the effects of up/down chirped signals from an optical source.

Figure 4A:
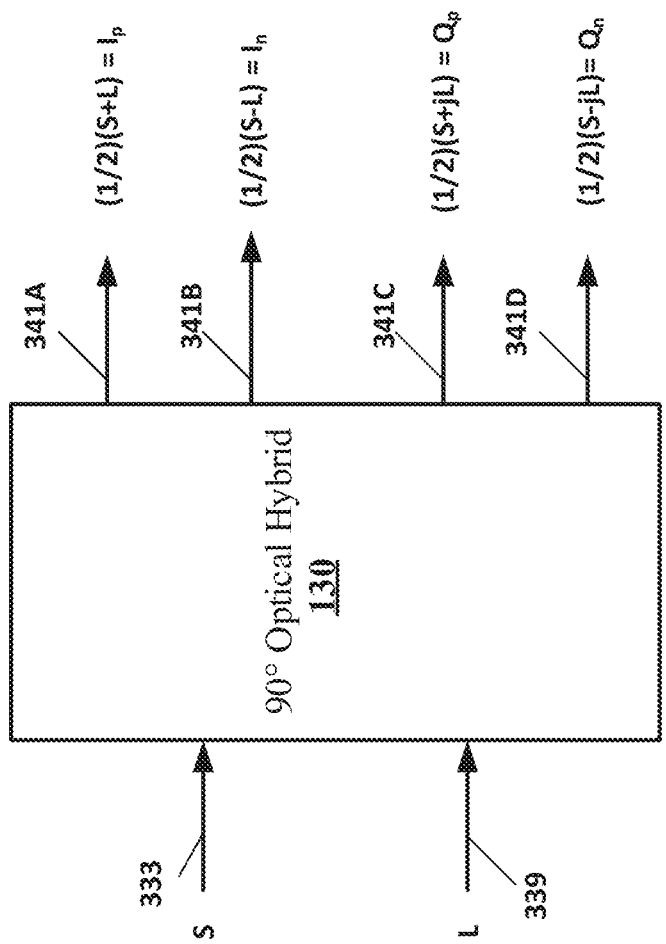
FIG. 4A is a block diagram illustrating an example of a 90° optical hybrid according to embodiments of the present disclosure.
Figure 4D:
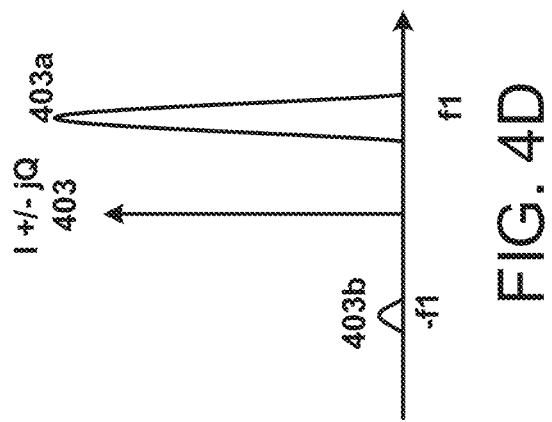
FIGS. 4B-4D are illustrating an example of image suppressing using an 90° optical hybrid according to embodiments of the present disclosure.
Figure 4B:
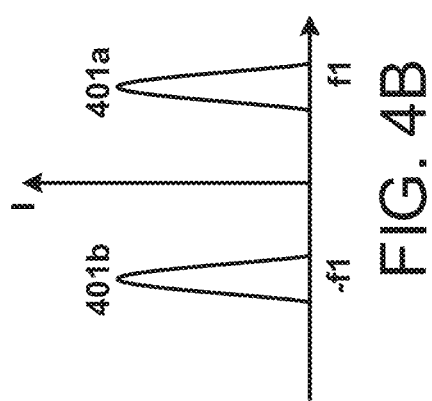
Figure 4C:
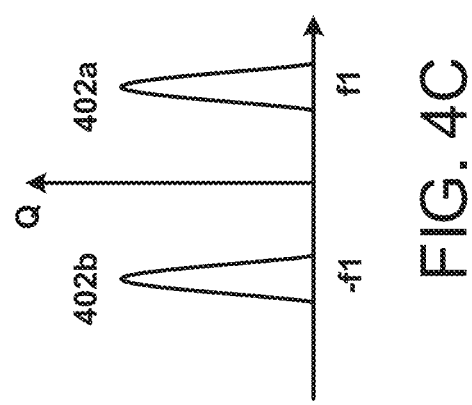

FIG. 4A is a block diagram illustrating an example of the 90° optical hybrid 130 according to embodiments of the present disclosure. FIGS. 4B-4D are illustrating an example of image suppressing using the 90° optical hybrid 130 according to embodiments of the present disclosure. Referring to FIG. 4A and FIGS. 4B-4D, utilizing the coherent receiver 160 with the 90° optical hybrid 130, both the real and complex portions of the reference beat frequency may be recovered and processed with digital signal processing, e.g., at the DSP 117 in the signal processing unit 112 in FIG. 1A.

As depicted in FIG. 4A, the 90° optical hybrid 130 has two inputs to receive the optical signal 339 and the reference LO signal 333 in the reference path. The optical signal 339 and the reference LO signal 333 may be expressed as below:

$$\text{Signal}=S=E_s e^{j\omega_s t} \quad (1)$$

$$\text{LO}=L=E_{LO} e^{j\omega_{LO} t} \quad (2)$$

where S represents the optical signal 339, and L represents the reference LO signal 333.

Referring to FIGS. 4A-4D, the 90° optical hybrid 130 may include linear dividers and combiners interconnected in such a way that four different vectorial additions of the reference LO signal 333 and the optical signal 339 are obtained. As an example, the 90° optical hybrid 130 may mix the incoming optical signal 339 with the four quadratural states associated with the reference LO signal 333 in the complex-field space. The 90° optical hybrid 130 further has four primary outputs 341A, 341B, 341C, 341D, which mix the two input optical signals 333, 339 in 90° phase intervals from each other.

For example, the four output signals 341A, 341B, 341C, 341D may be delivered to photodetectors 131, 132. The photodetector 131 may receive the output signal 341A and the output signal 341B to generate a mixed signal 326. The photodetector 132 may receive the output signal 341C and the output signal 341D to generate a mixed signal 328. The coherent receiver 160 may have two output signals 326, 328. The output mixed signal 326 may be called I, which may be the real numbered portion of the reference beat frequency. The output mixed signal 328 may be called Q, which may be the imaginary numbered portion of the reference beat frequency.

Referring to FIGS. 4B-4D, as an example, the process of suppressing the negative frequency image of the reference beat frequency signal may be expressed as below. If each of the mixed signals (e.g., I, Q) is a simple sine tone at the reference beat frequency f1, each of the mixed signals may appear as both a peak (e.g., 401a, 402a) at the positive reference beat frequency f1 and a peak (e.g., 401b, 402b) at the negative reference beat frequency −f1, in the frequency domain. The real portion I of the reference beat signal, may be expressed as:

$$I = I_p - I_n = \qquad (3)$$

$$R\left(\frac{1}{4}|S+L|^2 - \frac{1}{4}|S-L|^2\right) = R\frac{1}{4}((S+L)(S^*+L^*) - (S-L)(S^*-L^*)) =$$

$$R\frac{1}{4}\left(|S|^2 + |L|^2 + SL^* + S^*L - |S|^2 - |L|^2 + SL^* + S^*L\right) = R\frac{1}{2}(SL^* + S^*L)$$

where R is the photodetector responsivity.

The complex portion Q of the reference beat signal may be expressed as:

$$Q = Q_p - Q_n = R\left(\frac{1}{4}|S+jL|^2 - \frac{1}{4}|S-jL|^2\right) = \qquad (4)$$

$$R\frac{1}{4}((S+jL)(S^*-jL^*) - (S-jL)(S^*+jL^*)) = R\frac{1}{4}$$

$$\left(|S|^2 + |L|^2 + jS^*L - jSL^* - |S|^2 - |L|^2 + jS^*L - jSL^*\right) = R\frac{j}{2}(S^*L - SL^*)$$

where j is the imaginary number j=sqrt(−1), and R is the photodetector responsivity.

The output signal 326 and the output signal 328 are 90° from each other, and are combined to return a single combined reference signal 403, which is a complex exponential with a phase being the frequency difference between the two input signals 333, 339. The combined reference signal 403 is generated to suppress the negative image of the reference beat frequency signal. For example, the combined reference signal 403 may be expressed as:

$$I + jQ = R\frac{1}{2}((SL^* + S^*L) - (S^*L - SL^*)) = RSL^* = RE_x E_{LO} e^{j(\omega_s - \omega_{LO})t} \qquad (5)$$

By combining the output signal 326 and the output signal 328 with image suppressing, the single combined reference signal appears as a single peak 403a, while the negative peak 403b being suppressed, e.g., to be close to zero. With the IQ based coherent receiver 160, the negative image of the reference beat frequency is suppressed. Thus, the SNR for the target is improved. Therefore, the accuracy of determining the range and velocity of the target is increased.

In some other embodiments, if balanced or differential detection is not preferred to save cost and reduce complexity, utilizing all 4 output signals from the 90° optical hybrid 130 may not be necessary for suppressing the negative image of the reference beat frequency signal. Single ended detection of the I and Q signals may be used to produce an image rejection, as long as the signals selected for the I and the signal selected for the Q are still 90° apart from each other. As an example, I=Ip and Q=Qp, or I=I p and Q=Qn.

Referring back to FIG. 4A, when single ended detection of the I and Q signals is used, for example, the photodetector 131 may receive the output signal 341A. The photodetector 132 may receive the output signal 341C. The output mixed signal 326, which may be called I, is equivalent to 341A (e.g., Ip). The output mixed signal 328, which may be called Q, is equivalent to 341C (e.g., Qp).

In this example, the real portion I of the reference beat frequency, may be expressed as:

$$I = I_p = R(\tfrac{1}{4}|S+L|^2) = R\tfrac{1}{4}((|S|^2+|L|^2+SL^*+S^*L) \quad (6)$$

The complex portion Q of the reference beat frequency may be expressed as:

$$Q = Qp = R(\tfrac{1}{4}|S+jL|^2) = R\tfrac{1}{4}((|S|^2+|L|^2+jS^*L-jSL^*) \quad (7)$$

For example, the combined reference signal 403 may be expressed as:

$$I + jQ = R\tfrac{1}{4}(|S|^2 + |L|^2 + SL^* + S^*L + j|S|^2 + j|L|^2 - S^*L + SL^*) = \quad (8)$$
$$R\tfrac{1}{4}((1+j)(|S|^2 + |L|^2) + R\tfrac{1}{2}SL^* = DC + R\tfrac{1}{2}E_x E_{LO} e^{j(\omega_s - \omega_{LO})t}$$

By using the single ended detection of the I and Q signals, the total signal power may be reduced, e.g., by 3 dB. There may be a DC term remaining as well.

Figure 5A:
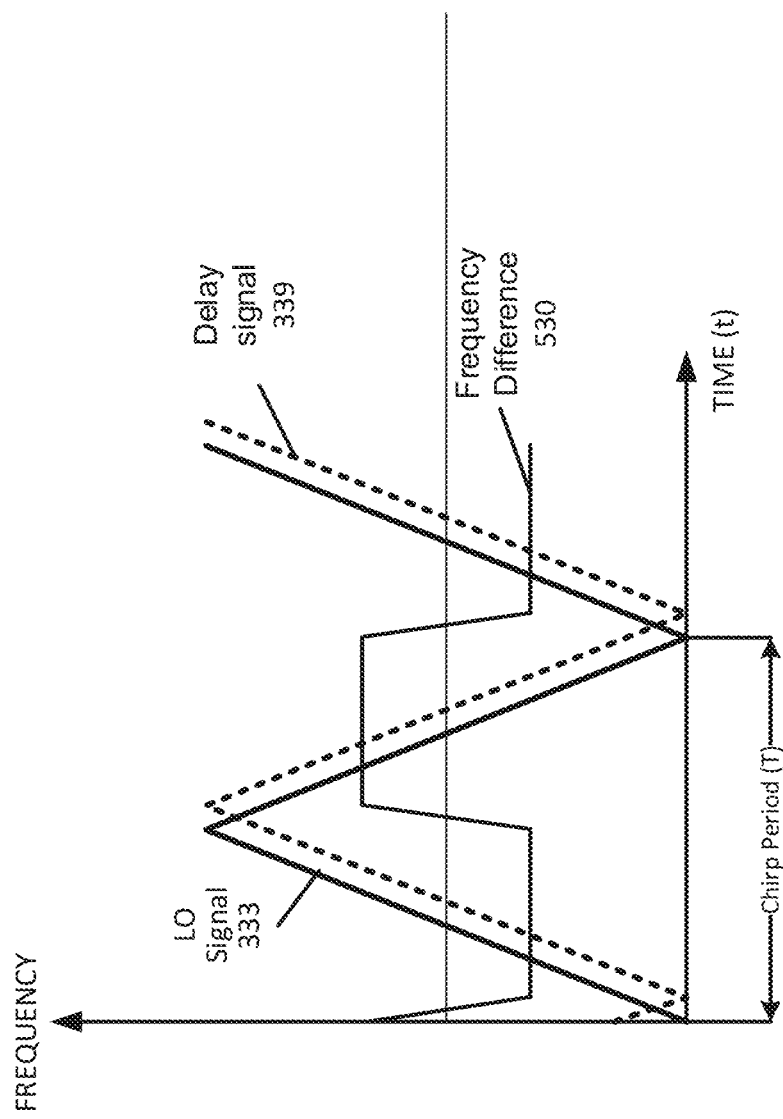
FIG. 5A is a diagram illustrating an example of a chirp signal with up and down chirping according to embodiments of the present disclosure.

FIG. 5A is a diagram illustrating an example of a chirp signal with up and down chirping according to embodiments of the present disclosure. Referring to FIG. 5A, in some embodiments, the LiDAR system 100 may utilize an up and down sweep of frequency. For example, in an up-sweeping (e.g., up-chirping), the frequency of the scanning signal may be increasing over time; in a down-sweeping (e.g., down-chirping), the frequency of the scanning signal may be decreasing over time. Thus, the frequency difference 530 between the delay path signal (e.g., the optical signal 339) and the non-delay path signal (e.g., the reference LO signal 333) may flip in sign depending on the sweep direction (e.g., chirp direction). For example, during the up sweeping period, the sign of the frequency difference between the delay path optical signal 339 and the reference LO signal 333 may be negative; during the down sweeping period, the sign of the frequency difference 530 between the delay path optical signal 339 and the reference LO signal may be positive. The flip of sign may switch the suppressed image from the negative axis to the positive axis unless it is corrected for.

Figure 5C:
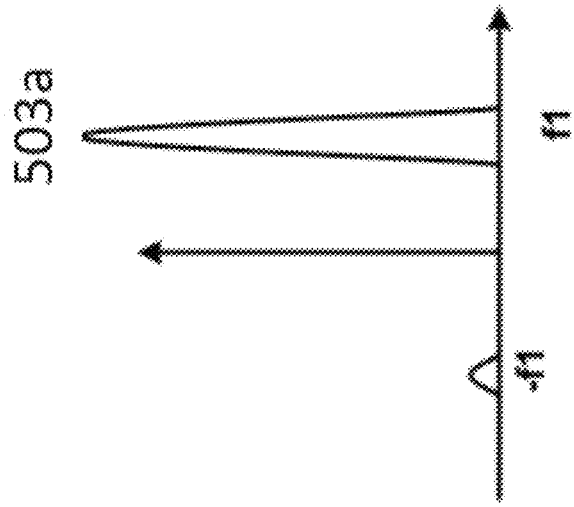
FIGS. 5B-5C are diagrams illustrating an example of a combined reference signal without or with applying a polarity correction respectively according to embodiments of the present disclosure.
Figure 5B:
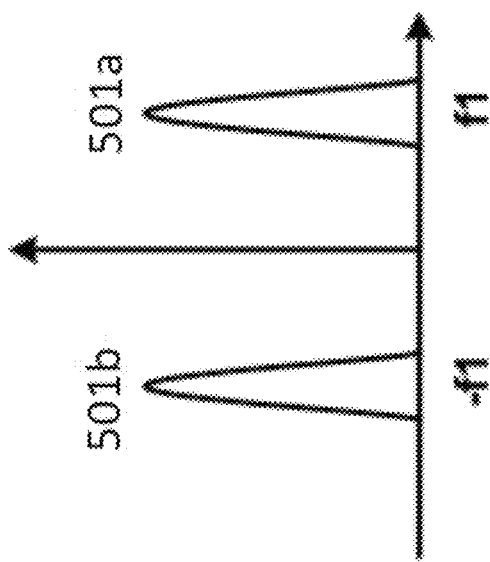

FIGS. 5B-5C are diagrams illustrating an example of a combined reference signal without or with applying a polarity correction respectively according to embodiments of the present disclosure. As illustrated in FIG. 5B, without applying the polarity correction, because the suppressed image is switched from the negative axis to the positive axis, there are two peaks 501a, 501b in the combined reference signal covering multiple up/down periods, the negative image of the reference beat signal is not consistently suppressed.

If the positive image (or the negative image) is to be preserved consistently, the polarity correction is applied to the combination of the signal I and the signal Q depending on the sweep direction (e.g., chirp direction). The signal portion Q may have the alternated positive and negative sign depending on the direction of the frequency sweeping (e.g., chirping). As an example, a ±1 square wave, which has the alternated positive and negative sign, with a period equal to the up/down sweeping period, and aligned with the start of the up/down sweeping may be used to correct the polarity. When the ±1 square wave is used, the polarity of the frequency difference is corrected. As illustrated in FIG. 5C, there is only one peak 503a in the combined reference signal, thus, the negative image of the reference beat signal is suppressed and not visible.

Figure 6:
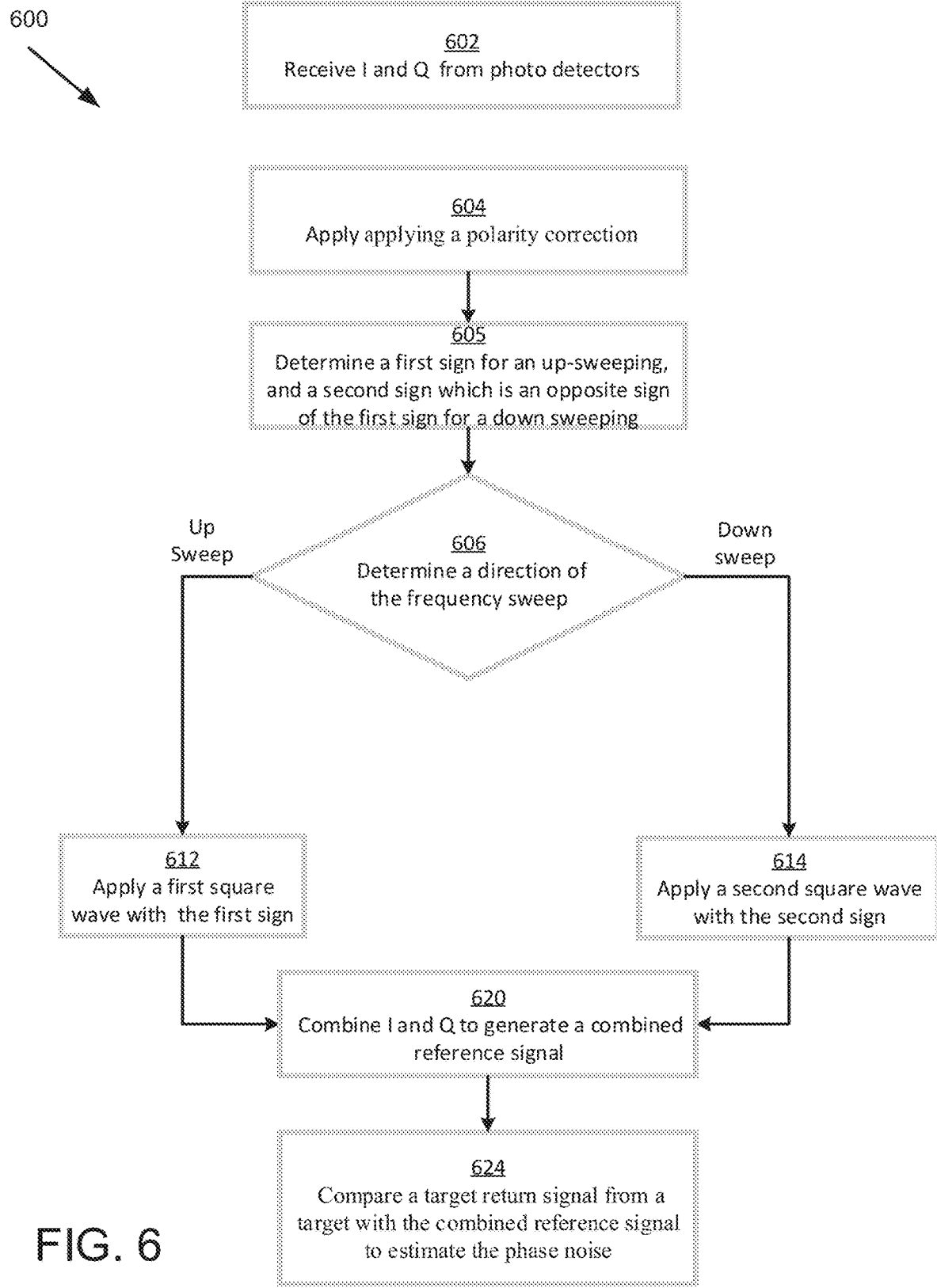
FIG. 6 is a flow diagram illustrating an example of applying a polarity correction according to embodiments of the present disclosure.

FIG. 6 is a flow diagram illustrating an example of a method 600 of applying a polarity correction according to embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 600 may be performed by a processor, e.g., a signal processing unit 112 of a LiDAR system, as illustrated in FIG. 1A-FIG. 1B. By this method, when combining the mixed signals 326, 328 (e.g., I, Q) from the coherent receiver 160, a sign of the mixed signal 328 (e.g., Q) is determined depending on a direction of frequency sweeping.

At block 602, the mixed signals 326, 328 (e.g., I, Q) are received from the photodetectors 131, 132 of the coherent receiver 160. As illustrated in FIG. 1B, a polarity correction module 122 may receive the mixed signals 326, 328 (e.g., I, Q) from the photodetectors 131, 132 of the coherent receiver 160.

At block 604, the polarity correction is applied.

At block 605, a sign associated with an up-sweeping scan is determined, and a sign associated with a down-sweeping scan is determined. The sign associated with the down-sweeping scan is an opposite sign from the sign associated with the up-sweeping scan. At block 606, a direction of the frequency sweep is determined. For example, a square wave is to be applied to change the sign of the mixed signal 328 (e.g., Q).

At block 612, for the up-sweeping scan, a square function with the sign associated with the up-sweeping scan is applied to the mixed signal Q. For example, when the direction is an up-sweeping direction, the sign is determined to be positive.

At block 614, for the down-sweeping scan, the square function with the sign associated with the down-sweeping scan is applied to the mixed signal 328 (e.g., Q. For example, when the direction is a down-sweeping direction, the sign is determined to be negative.

At block 620, the mixed signal 326 (e.g., I) is combined with the mixed signal 328 (e.g., Q) in the positive sign in up-sweeping or the negative sign in down-sweeping, in order to generate the combined reference signal (e.g., I+/− jQ).

At block 624, the phase noise of the optical source may be estimated by comparing the target return signal. (e.g., 309) with the combined reference signal (e.g., 403).

Figure 7A:
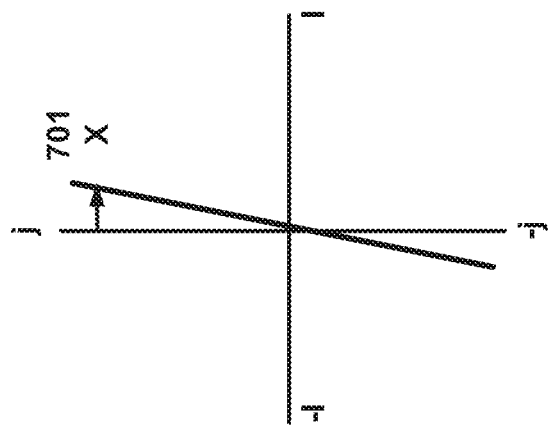
FIGS. 7A-7B are diagrams illustrating an example of correcting for imperfections of a 90° optical hybrid receiver, according to embodiments of the present disclosure.
Figure 7B:
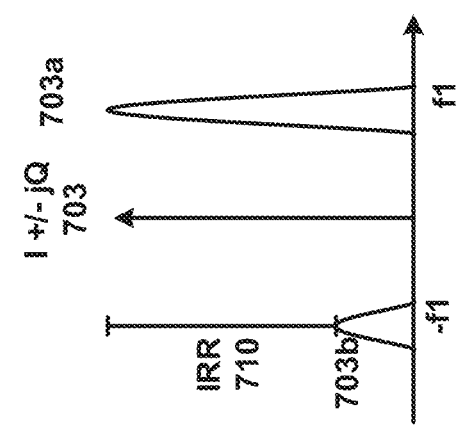

FIGS. 7A-7B are diagrams illustrating an example of correcting for imperfections of the 90° optical hybrid 130, according to embodiments of the present disclosure. There may be imperfections in the optical hybrid angle or amplitude imbalance between the paths of the output signals 341A—341D. Some signal processing schemes may be used to correct for the imperfections of the 90° optical hybrid receiver, and to account for the effects of up/down chirped signals from the optical source.

As depicted in FIG. 7A, there may be imperfections in the 90° optical hybrid 130 itself, such as the angle not being exactly 90°. The hybrid angle 701 between the output mixed signals I and Q may have the value "x". There may be amplitude imbalances between the I and Q paths, or even physical delay differences in the I and Q paths from the 90° optical hybrid 130, or even after the 90° optical hybrid 130 up through the signal processing chain. As a result of the optical hybrid angle 701 and/or the amplitude imbalance, the negative peak 703b may not be completely suppressed, as depicted in FIG. 7B. The image rejection ratio (IRR) may be determined by the optical hybrid angle 701 and the amplitude imbalance. As an example, the IRR may refer to a signal strength of the positive image peak 703a to that of the negative image peak 703b of the reference beat signal 703. The IRR is usually expressed in dB.

The imperfections of the 90° optical hybrid 130 may be mitigated in the DSP 117. In one embodiment, the imperfections of the 90° optical hybrid 130 may be corrected by digitally adjusting the amplitude of the signal I and/or Q after normalization. For example, at least one of the amplitude of the signal I or Q may be digitally adjusted after normalization.

In one embodiment, the imperfections of the 90° optical hybrid 130 may be corrected by combining I and Q at an angle slightly different from 90°. For example, combining the signal I and Q at 90° may be expressed as: I+jQ, where $j=e(j90\pi/180)$; while combining the signal I and Q at an angle x off from 90° may be expressed $I+e(j(90-x)\pi/180)Q$.

In one embodiment, the imperfections of the 90° optical hybrid 130 may be corrected by de-skewing the signal I and/or Q in time to mitigate any time delay between them. For example, at least one of the signal I and/or Q may be de-skewed in time to mitigate any time delay between them. The optimal values for these adjustments may be done as a simple calibration and the image rejection ratio between the positive and negative image of the reference beat frequency may be used as the calibration feedback.

Figure 8:
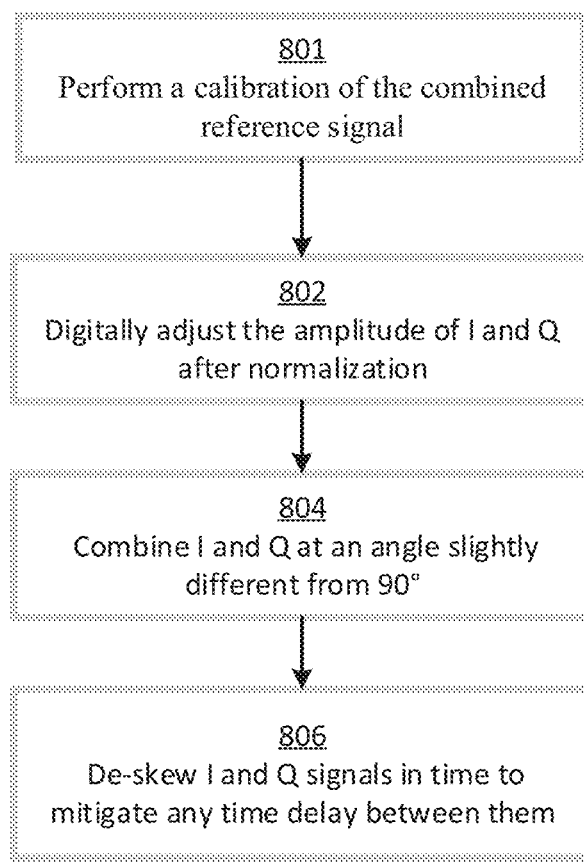
FIG. 8 is a flow diagram illustrating an example of a process of correcting for imperfections of a 90° optical hybrid receiver according to embodiments of the present disclosure.

FIG. 8 is a flow diagram illustrating an example of a method 800 of correcting for imperfections of a 90° optical hybrid receiver according to embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 800 may be performed by a processor, e.g., a signal processing unit 112 of a LiDAR system, as illustrated in FIG. 1A-FIG. 1B. In this method, the imperfections of the 90° optical hybrid 130 may be corrected by digitally adjusting the amplitude of I and Q after normalization, combining I and Q at an angle slightly different from 90°, or de-skewing I and Q signals in time to mitigate any time delay between them.

Referring to FIG. 8, at block 801, a calibration of the combined reference signal is performed. As an example, the incoming mixed signals 326 and 328 (e.g., I and Q) data from the ADCs 325, 327 may be normalized. For example, a feedback of the calibration comprises an IRR between a positive image and the negative image of the reference beat frequency.

At block 802, the amplitude of the incoming mixed signals 326 and 328 are digitally adjust after normalization. As an example, the amplitude of the incoming mixed signals 326 and 328 are digitally adjust to compensate for the amplitude imbalance.

At block 804, the incoming mixed signals 326 and 328 are combined at an angle different from 90°. As an example, the amplitude of the incoming mixed signals 326 and 328 are combined to compensate for the hybrid angle x.

At block 806, the incoming mixed signals 326 and 328 are de-skewed in a time domain to mitigate any time delay between the mixed signal 326 and the mixed signal 328.

By this way, the IRR between the positive image and the negative image of the reference beat frequency is increased, thereby improving the target SNR and the accuracy of the velocity and range estimation of the target.

FIG. 9 is a flow diagram illustrating an example of a method 900 of using a coherent reference receiver in a LiDAR system according to embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 900 may be performed by a processor, e.g., a signal processing unit 112 of a LiDAR system, as illustrated in FIG. 1A-FIG. 1B. By this method, the negative image of the reference beat frequency is suppressed, and the target SNR is improved. Therefore, the accuracy of determining the range and velocity information of the target is improved.

Referring to FIG. 9, at block 902, an optical beam is emitted by an optical source along a target path towards a target and a reference path.

At block 904, a portion of the optical beam and a LO signal are received and mixed by a coherent receiver disposed in the reference path. Block 904 includes blocks 906, 908 and 910. At block 906, the portion of the optical beam and the LO signal are received by a 90° optical hybrid to generate a first, a second, a third and a fourth output signal. At block 908, the first and the second output signal are received by a first photodetector to generate a first mixed signal. At block 910, the third and the fourth output signal are received by a second photodetector to generate a second mixed signal.

At block 912, combining the first mixed signal and the second mixed signal are combined by a processor to generate a combined reference signal to suppress a negative image of a beat frequency signal produced by the optical beam and the LO signal to estimate a phase noise of the optical source to determine range and velocity information of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LiDAR) system, comprising:
    an optical source to emit an optical beam along a target path towards a target and a reference path;
    a coherent receiver disposed in the reference path, comprising:
        a 90° optical hybrid to receive a portion of the optical beam along the reference path and a local oscillator (LO) signal to generate a first, a second, a third and a fourth output signal;
        a first photodetector to receive the first and the second output signal to generate a first mixed signal; and
        a second photodetector to receive the third and the fourth output signal to generate a second mixed signal, wherein the coherent receiver is disposed to mix the portion of the optical beam with the LO signal; and
    a processor to combine the first mixed signal and the second mixed signal to generate a combined reference signal to suppress a negative image of a reference beat frequency signal produced by the optical beam and the LO signal to estimate a phase noise of the optical source to determine range and velocity information of the target, wherein the processor is further configured to improve an image rejection ratio to correct a hybrid angle and amplitude balance imperfections to suppress the negative image.

2. The LiDAR system of claim 1, wherein the processor is further configured to compare a target return signal from the target with the combined reference signal to estimate the phase noise.

3. A light detection and ranging (LiDAR) system, comprising:
    an optical source to emit an optical beam along a target path towards a target and a reference path;
    a coherent receiver disposed in the reference path, comprising:
        a 90° optical hybrid to receive a portion of the optical beam along the reference path and a local oscillator (LO) signal to generate a first, a second, a third and a fourth output signal;
        a first photodetector to receive the first and the second output signal to generate a first mixed signal; and
        a second photodetector to receive the third and the fourth output signal to generate a second mixed signal, wherein the coherent receiver is disposed to mix the portion of the optical beam with the LO signal; and
    a processor to combine the first mixed signal and the second mixed signal to generate a combined reference signal to suppress a negative image of a reference beat frequency signal produced by the optical beam and the LO signal to estimate a phase noise of the optical source to determine range and velocity information of the target, wherein the processor is to generate the combined reference signal by applying a polarity correction.

4. The LiDAR system of claim 3, wherein the processor is to determine a sign of the second mixed signal depending on a direction of frequency sweeping.

5. The LiDAR system of claim 4, wherein, provided the direction is an up-sweeping direction, the processor is to determine the sign of the second mixed signal to be a first sign.

6. The LiDAR system of claim 5, wherein, provided the direction is a down-sweeping direction, the processor is to determine the sign of the second mixed signal to be a second sign which is an opposite sign of the first sign.

7. The LiDAR system of claim 4, wherein the processor is to apply a square wave to change the sign.

8. The LiDAR system of claim 1, wherein processor is further configured to improve an image rejection ratio by performing a calibration of the combined reference signal.

9. The LiDAR system of claim 8, wherein a feedback of the calibration comprises an image rejection ratio between a positive image and the negative image of the reference beat frequency.

10. The LiDAR system of claim 8, wherein the processor is to digitally adjust an amplitude of at least one of the first mixed signal or the second mixed signal after normalization.

11. The LiDAR system of claim 8, wherein the processor is to combine the first mixed signal and the second mixed signal at an angle different from 90°.

12. The LiDAR system of claim 8, wherein the processor is to de-skew at least one of the first mixed signal or the second mixed signal in a time domain to mitigate any time delay between the first mixed signal and the second mixed signal.

13. A method of light detection and ranging (LiDAR), comprising:
    emitting an optical beam by an optical source along a target path towards a target and a reference path;
    receiving and mixing a portion of the optical beam and a local oscillator (LO) signal by a coherent receiver disposed in the reference path, comprising:
        receiving the portion of the optical beam and the LO signal by a 90° optical hybrid to generate a first, a second, a third and a fourth output signal;
        receiving the first and the second output signal by a first photodetector to generate a first mixed signal; and receiving the third and the fourth output signal by a second photodetector to generate a second mixed signal;

combining, by a processor, the first mixed signal and the second mixed signal to generate a combined reference signal to suppress a negative image of a reference beat frequency signal produced by the optical beam and the LO signal to estimate a phase noise of the optical source to determine range and velocity information of the target; and improving, by the processor, an image rejection ratio to correct a hybrid angle and amplitude balance imperfections to suppress the negative image.

14. The method of claim 13, further comprising comparing, by the processor, a target return signal from the target with the combined reference signal to estimate the phase noise.

15. A method of light detection and ranging (LiDAR), comprising:

emitting an optical beam by an optical source along a target path towards a target and a reference path;

receiving and mixing a portion of the optical beam and a local oscillator (LO) signal by a coherent receiver disposed in the reference path, comprising:

receiving the portion of the optical beam and the LO signal by a 90° optical hybrid to generate a first, a second, a third and a fourth output signal;

receiving the first and the second output signal by a first photodetector to generate a first mixed signal; and receiving the third and the fourth output signal by a second photodetector to generate a second mixed signal; and combining, by a processor, the first mixed signal and the second mixed signal to generate a combined reference signal to suppress a negative image of a reference beat frequency signal produced by the optical beam and the LO signal to estimate a phase noise of the optical source to determine range and velocity information of the target, wherein the combining, by the processor, the first mixed signal and the second mixed signal to generate the combined reference signal comprises combining, by the processor, the first mixed signal and the second mixed signal to generate the combined reference signal by applying a polarity correction.

16. The method of claim 15, wherein the applying the polarity correction comprises determining a sign of the second mixed signal depending on a direction of frequency sweeping.

17. The method of claim 16, wherein the applying the polarity correction comprises, provided the direction is an up-sweeping direction, determining the sign of the second mixed signal to be a first sign.

18. The method of claim 16, wherein the applying the polarity correction comprises, provided the direction is a down-sweeping direction, determining the sign of the second mixed signal to be a second sign which is an opposite sign of the first sign.

19. The method of claim 13, wherein the combining, by the processor, the first mixed signal and the second mixed signal to generate the combined reference signal comprises performing a calibration of the combined reference signal.

* * * * *